US010114246B2

(12) United States Patent
Guo et al.

(10) Patent No.: US 10,114,246 B2
(45) Date of Patent: Oct. 30, 2018

(54) ARRAY SUBSTRATE, LIQUID CRYSTAL DISPLAY PANEL, AND METHOD FOR DRIVING THE LIQUID CRYSTAL DISPLAY PANEL (71) Applicant: Shenzhen China Star Optoelectronics Technology Co. Ltd., Shenzhen (CN)

(72) Inventors: Jinbo Guo, Shenzhen (CN); Jinjie Wang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/897,678

(22) PCT Filed: Nov. 4, 2015

(86) PCT No.: PCT/CN2015/093789
§ 371 (c)(1),
(2) Date: Dec. 11, 2015

(87) PCT Pub. No.: WO2017/063239
PCT Pub. Date: Apr. 20, 2017

(65) Prior Publication Data
US 2018/0157096 A1 Jun. 7, 2018

(30) Foreign Application Priority Data
Oct. 16, 2015 (CN) .......................... 2015 1 0670494

(51) Int. Cl.
G02F 1/1362 (2006.01)
G09G 3/36 (2006.01)
G02F 1/1335 (2006.01)

(52) U.S. Cl.
CPC ...... *G02F 1/133512* (2013.01); *G02F 1/1362* (2013.01); *G02F 1/133611* (2013.01);
(Continued)

(58) Field of Classification Search
CPC ............. G02F 1/136286; G02F 1/1362; G02F 1/136209; G02F 1/133512;
(Continued)

(56) References Cited

U.S. PATENT DOCUMENTS 5,253,091 A * 10/1993 Kimura ................ G09G 3/3648
345/87
7,812,911 B2 * 10/2010 Song ................. G02F 1/133514
349/145
(Continued)

FOREIGN PATENT DOCUMENTS

CN 101685230 A 3/2010
CN 102169261 A 8/2011
(Continued)

*Primary Examiner* — Jia Pan
(74) *Attorney, Agent, or Firm* — Buchanan Ingersoll & Rooney PC (57) ABSTRACT

Disclosed is an array substrate, a liquid crystal display panel, and a driving method. The array substrate includes a plurality of pixel units, which is arranged in a pixel matrix; and a plurality of data lines, which is arranged to run through the pixel units. With respect to each of the data lines inside of boundary data lines of the pixel matrix, two pixel units electrically connected thereto in sequence are located in adjacent rows and at adjacent columns in the pixel matrix. The array substrate improves an aperture ratio of the pixel unit, which contributes to improvement of the quality of images.

9 Claims, 4 Drawing Sheets

(52) U.S. Cl.
CPC .. *G02F 1/136209* (2013.01); *G02F 1/136286* (2013.01); *G09G 3/3611* (2013.01); *G09G 3/3614* (2013.01)

(58) Field of Classification Search
CPC ............ G02F 1/133611; G09G 3/3611; G09G 3/3614; G09G 2300/0426
See application file for complete search history.

(56) References Cited

U.S. PATENT DOCUMENTS

| | | | | |
|---|---|---|---|---|
| 8,035,610 | B2* | 10/2011 | Hsu | G09G 3/3648 345/103 |
| 8,711,302 | B2* | 4/2014 | Kim | G02F 1/134309 349/110 |
| 2003/0117542 | A1 | 6/2003 | Choo | |
| 2005/0219196 | A1* | 10/2005 | Lee | G09G 3/3614 345/100 |
| 2008/0024408 | A1* | 1/2008 | Sano | G09G 3/3648 345/88 |
| 2009/0091669 | A1* | 4/2009 | Wang | G02F 1/133707 349/37 |
| 2010/0073273 | A1* | 3/2010 | Nam | G02F 1/136286 345/92 |
| 2011/0156992 | A1* | 6/2011 | Moon | G09G 3/3607 345/84 |
| 2012/0105494 | A1 | 5/2012 | Lee et al. | |
| 2013/0044281 | A1* | 2/2013 | Zhou | G02F 1/136286 349/73 |
| 2015/0015623 | A1 | 1/2015 | Yang et al. | |
| 2015/0146126 | A1* | 5/2015 | Shin | G02F 1/134309 349/43 |
| 2015/0286102 | A1 | 10/2015 | Lo et al. | |
| 2016/0131953 | A1 | 5/2016 | Xu et al. | |
| 2016/0171946 | A1 | 6/2016 | Chen et al. | |

FOREIGN PATENT DOCUMENTS

| | | |
|---|---|---|
| CN | 102456334 A | 5/2012 |
| CN | 103869566 A | 6/2014 |
| CN | 103926775 A | 7/2014 |
| CN | 104049429 A | 9/2014 |
| CN | 104375313 A | 2/2015 |
| CN | 104503157 A | 4/2015 |

* cited by examiner

Prior Art

Fig. 6b

ARRAY SUBSTRATE, LIQUID CRYSTAL DISPLAY PANEL, AND METHOD FOR DRIVING THE LIQUID CRYSTAL DISPLAY PANEL

CROSS-REFERENCE TO RELATED APPLICATIONS

The present application claims the priority of Chinese patent application CN 201510670494.9, entitled "Array substrate, liquid crystal display panel, and method for driving the liquid crystal display panel" and filed on Oct. 16, 2015, the entirety of which is incorporated herein by reference.

FIELD OF THE INVENTION

The present disclosure relates to the field of liquid crystal display, and in particular, to an array substrate, a liquid crystal display panel, and a method for driving the liquid crystal display panel.

BACKGROUND OF THE INVENTION

With the development of liquid crystal display technologies, higher requirements are put forward for the quality of a picture displayed by a liquid crystal display device. Improvement in the brightness of the liquid crystal display device enables more natural and beautiful pictures displayed, and thus is an important content in enhancing picture quality. The main measures for high brightness design include increasing the brightness of a backlight and improving the transmittance of a display screen. Increasing an aperture ratio of a pixel unit can effectively improve the transmittance of the display screen.

The aperture ratio of a pixel unit refers to a ratio of an effective light transmission area in the pixel unit of the liquid crystal display device to an entire area of the pixel unit. Because signal wires for driving switch elements are provided between pixel electrodes of different pixel units on an array substrate, and gaps formed between the signal wires and the pixel electrodes will cause light leakage, it is necessary to provide a black matrix on a CF substrate for light shielding. However, the black matrix will seriously affect the aperture ratio of the pixel unit.

At present, improvements that have been made to the black matrix include the BM on array technology in which the black matrix is arranged on the array substrate, and thinning of data line wiring. Among them, the black matrix can be arranged on the array substrate to reduce a size designed for the black matrix while the requirements for cell alignment are satisfied. However, such a technology is not widely spread due to material limitations. And thinning of wiring will lead to insufficient data write capacity and in-plane DC deterioration, and thus lead to deterioration of brightness uniformity, screen flickering, long-term residual images and other adverse effects. Therefore, there is no effective solution to the problem of decreased aperture ratio of the pixel unit caused by the black matrix.

To conclude the above, it is urgent to improve the black matrix, so as to improve the aperture ratio of the pixel unit.

SUMMARY OF THE INVENTION

One technical problem to be solved by the present disclosure is that it is necessary to improve a black matrix, so as to improve an aperture ratio of a pixel unit.

In order to solve the above technical problem, an array substrate is first provided in an embodiment of the present disclosure, comprising: a plurality of pixel units, which is arranged in a pixel matrix having rows and columns; and a plurality of data lines, which is arranged to run through the pixel units, each of the data lines capable of simultaneously driving a plurality of pixel units along a column direction, wherein with respect to each of the data lines inside of boundary data lines of the pixel matrix, two pixel units electrically connected thereto in sequence are located in adjacent rows and at adjacent columns in the pixel matrix.

Preferably, gaps formed between the plurality of pixel units are shielded with a common electrode layer provided on the array substrate to prevent light leakage.

Preferably, the data lines are arranged to run through center portions of the pixel units.

Preferably, an $n^{th}$ data line among the plurality of data lines located inside of the boundary data lines of the pixel matrix is electrically connected in sequence to an $n^{th}$ pixel unit in a $(2m-1)^{th}$ row and an $(n+1)^{th}$ pixel unit in a $2m^{th}$ row of the pixel matrix, m and n both being positive integers.

Preferably, an $n^{th}$ data line among the plurality of data lines located inside of the boundary data lines of the pixel matrix is electrically connected in sequence to an $n^{th}$ pixel unit in a $(2m-1)^{th}$ row and an $(n-1)^{th}$ pixel unit in a $2m^{th}$ row of the pixel matrix, m being a positive integer, and n being a positive integer greater than 1.

Preferably, an $n^{th}$ data line among the plurality of data lines located inside of the boundary data lines of the pixel matrix is electrically connected in sequence to an $n^{th}$ pixel unit in a $(2m-1)^{th}$ row, an $(n-1)^{th}$ pixel unit in a $2m^{th}$ row, an $n^{th}$ pixel unit in a $(2m+1)^{th}$ row, and an $(n+1)^{th}$ pixel unit in a $(2m+2)^{th}$ row of the pixel matrix, m being a positive integer, and n being a positive integer greater than 1.

The present disclosure further provides a liquid crystal display panel, comprising an array substrate, which includes: a plurality of pixel units, which is arranged in a pixel matrix having rows and columns; and a plurality of data lines, which is arranged to run through the pixel units, each of the data lines capable of simultaneously driving a plurality of pixel units along a column direction, wherein with respect to each of the data lines inside of boundary data lines of the pixel matrix, two pixel units electrically connected thereto in sequence are located in adjacent rows and at adjacent columns in the pixel matrix.

According to another aspect, a method for driving a liquid crystal display panel is provided, comprising the steps of: driving, in display of a same picture frame, any two adjacent columns of pixel units with driving signals of different polarities respectively; and driving, in display of any two consecutive picture frames, a same column of pixel units with driving signals of different polarities respectively.

Preferably, during display of a picture frame, odd-numbered columns of the plurality of data lines are driven with positive-polarity driving signals, and even-numbered columns of the plurality of data lines are driven with negative-polarity driving signals; and during display of a next picture frame of the above picture frame, odd-numbered columns of the plurality of data lines are driven with negative-polarity driving signals, and even-numbered columns of the plurality of data lines are driven with positive-polarity driving signals.

Preferably, the positive-polarity driving signals are voltage signals applied to the pixel electrode and higher than a voltage applied to a common electrode voltage, and the negative-polarity driving signals are voltage signals applied to the pixel electrode and lower than the voltage applied to the common electrode voltage.

Compared with the prior art, one or more of the embodiments described above can have the following advantages or beneficial effects.

The data lines are arranged in an inner region of the pixel unit, such that it is unnecessary to provide a black matrix for light-shielding, thereby improving the aperture ratio of the pixel unit and the quality of images.

Other advantages, objectives, and features of the present disclosure will be set forth to a certain extent, in the description which follows and, to a certain extent, will be apparent to those skilled in the art based on observational study of the following description, or may be taught from implementation of the present disclosure. The objectives and other advantages of the present disclosure may be realized and obtained by the structure particularly pointed out in the following description, claims, and drawings.

BRIEF DESCRIPTION OF THE DRAWINGS

The drawings are provided for further understanding of the present disclosure or the prior art, and constitute one part of the description. They serve to explain the present disclosure in conjunction with the embodiments, rather than to limit the present disclosure in any manner. In the drawings:

FIGS. 3 (a) and (b) schematically show connection between and among data lines and pixel units according to the embodiment of the present disclosure;

FIGS. 6 (a) and (6) schematically show grayscale voltages applied to a pixel unit during display of a special picture, wherein FIG. 6 (a) schematically shows grayscale voltages applied to a pixel unit in the prior art, and FIG. 6 (b) schematically shows grayscale voltages applied to a pixel unit according to the embodiment of the present disclosure.

DETAILED DESCRIPTION OF THE EMBODIMENTS

The present disclosure will be explained in detail with reference to the embodiments and the accompanying drawings in the following, whereby it can be fully understood how to solve the technical problem by the technical means according to the present disclosure and achieve the technical effects thereof, and thus the technical solution according to the present disclosure can be implemented. It is important to note that as long as there is no conflict, all the technical features mentioned in all the embodiments may be combined together in any manner, and the technical solutions obtained therefrom all fall within the scope of the present disclosure.

The following embodiments are explained with reference to the accompanying drawings specifically illustrating implementable embodiments of the present disclosure. Direction terms used in the present disclosure, such as "upper," "lower," "left," and "right," refer to respective directions relative to the drawings only. Hence, the direction terms used herein are intended to explain for understanding, rather than to limit the present disclosure.

Figure 1:
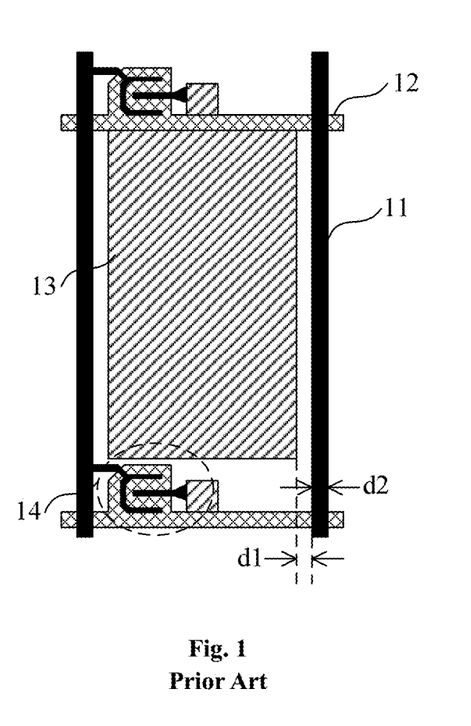
FIG. 1 schematically shows the structure of a pixel unit on an array substrate in the prior art.

FIG. 1 schematically shows the structure of a pixel unit on an array substrate in the prior art, in which reference numbers 11, 12, and 13 respectively represent a data line, a scan line, and a pixel electrode, and an area enclosed by a dotted line represents a switch element. Therein, the data line 11 is located on a same layer as a source and a drain of the switch element 14. The source of the switch element 14 is electrically connected to the pixel electrode 13, and can provide a grayscale voltage signal to the pixel electrode 13. A gate of the switch element 14 is located on a same layer as the scan line 12 and connected to the scan line 12, and the scan line 12 provides a control signal to the switch element 14 to turn it on or off. As shown in the figure, the data lines 11 in the prior art are arranged parallel to each other at boundaries of a pixel unit. In addition, when pixel units of the above-described structure are arranged in the form of a pixel matrix on the array substrate, one data line 11 can be used to drive an entire column of pixel units in the pixel matrix (not shown in FIG. 1).

It can also be seen from FIG. 1, when the data line 11 is disposed between adjacent pixel electrodes 13, in order to ensure that a signal on the data line 11 and a signal on the pixel electrode 13 do not influence each other, it is necessary to maintain a certain gap d1 between the data line 11 and the pixel electrode 13. Therefore, when a black matrix is provided, in order to prevent light leakage from the gap between the data line 11 and the pixel electrode 13, it is necessary to enable the black matrix to have a side width at least equal to 2*d1+d2, wherein d2 is a wiring width of the data line 11, as shown in FIG. 1, such that the black matrix can completely cover the gaps formed between the two adjacent pixel electrodes 13. On the other hand, the black matrix is generally arranged on a CF substrate. With the consideration that the CF substrate and the array substrate need to satisfy certain alignment precision in a cell procedure therebetween, it is necessary to leave a width margin for the side width of the black matrix based on the above 2*d1+D2, so as to ensure that the black matrix is still able to reliably shade light after the array substrate and the CF substrate are fit together. In particular, for a large-sized and high-resolution panel, a relative shift between an upper substrate and a lower substrate is large, so that a wide black matrix is required for light shielding, thereby seriously lowering an aperture ratio of the pixel unit. In view of the above-described problems, in an embodiment of the present disclosure, an array substrate is provided with such a structure that a black matrix will be unnecessary for light shielding.

Figure 2:
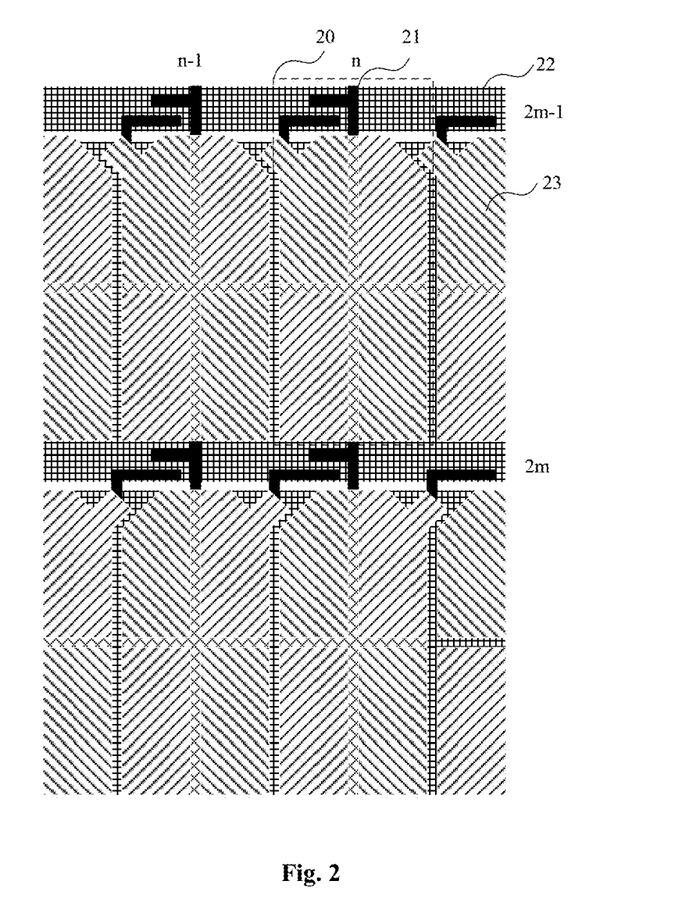
FIG. 2 schematically shows the structure of an array substrate according to an embodiment of the present disclosure.

FIG. 2 schematically shows the structure of an array substrate according to an embodiment of the present disclosure, in which an area 20 enclosed by a rectangle dashed box represents one pixel unit. In the embodiment as shown in FIG. 2, reference numbers 21, 23, and 22 respectively represent a data line, a pixel electrode, and a metal layer. A gate of a switch element, a scan line electrically connected to the gate, and a common electrode layer COM provided on an array substrate are specifically patterned on the metal layer. None of the above-mentioned structures is shown in FIG. 2. This, however, does not affect the solution of the embodiment of the present disclosure, nor will the form of the above-described structures limit the solution of the embodiment of the present disclosure.

As shown in FIG. 2, the data line 21 is not located at a boundary of the pixel unit 20 any longer. Instead, it penetrates an interior of the pixel unit 20 along a column direction of the pixel matrix, and is arranged below the pixel electrode 23. At the same time, the common electrode layer COM is used to shield the gap between two adjacent pixel units 20, such that it will be unnecessary to provide a black matrix on the CF substrate. Therein, the data line 21 is preferably arranged in such a manner that it penetrates a center portion of the pixel unit 20 (as shown in FIG. 2). This enables the data line 21 to be equally spaced from shielding wires formed by the common electrode layer COM located at boundaries of both sides of the pixel unit 20, thereby ensuring homogeneous liquid crystal display.

After the data line 21 is moved inside of the pixel unit 20, the gap between two adjacent pixel units 20 will be reduced, which is advantageous in reducing a light-shielding structure in size. And since the common electrode layer COM also provided on the array substrate is used to shield light, there is no problem concerning alignment precision. As a result, it is possible to reserve a smaller margin in consideration of a margin to be reserved for a width of the light-shielding structure. That is, an effective light transmission area maintained in the pixel unit 20 is increased, and the aperture ratio of the pixel unit can thus be increased.

As FIG. 2 further shows, when the data line 21 is provided below the pixel electrode 23, an area of the data line 21 directly facing the pixel electrode 23 increases, and a capacitive coupling effect of a parasitic capacitance between the data line 21 and the pixel electrode 23 thus increases. As a result, in display of a special picture (such as a gray bottom white box), relatively serious vertical crosstalk will be generated, thereby deteriorating the effect of liquid crystal display. In order to solve such a problem, in the embodiment of the present disclosure, with respect to each of the data lines, two pixel units electrically connected thereto in sequence are in alternate permutation, i.e., the two pixel units are located in adjacent rows and at adjacent columns in the pixel matrix. At the same time, different drive modes are used to eliminate vertical crosstalk.

Specifically, as shown in FIG. 2, an $n^{th}$ data line is electrically connected in sequence to an $n^{th}$ pixel unit in a $(2m-1)^{th}$ row of the pixel matrix and to an $(n-1)^{th}$ pixel unit in a $2m^{th}$ row, wherein m is a positive integer, and n is a positive integer greater than one. That is, when the pixel matrix has m rows, the $n^{th}$ data line is electrically connected in sequence to an $n^{th}$ pixel unit in a first row of the pixel matrix, a $(n-1)^{th}$ pixel unit in a second row, an $n^{th}$ pixel unit in a third row, a $(n-1)^{th}$ pixel unit in a fourth row, . . . , an $n^{th}$ pixel unit in an $m^{th}$ row (when m is an odd number) or an $(n-1)^{th}$ pixel unit in an $m^{th}$ row (when m is an even number).

Further, boundary data lines of the pixel matrix are arranged at outermost sides of all of the data lines. In the present embodiment, all the data lines are arranged in parallel and extend in a column direction. Thus, the boundary data lines of the pixel matrix correspond to a leftmost data line and a rightmost data line in the pixel matrix. A plurality of data lines located between the leftmost data line and the rightmost data line are defined as the plurality of data lines located inside of the boundary data lines of the pixel matrix. In the present disclosure, the boundary data lines of the pixel matrix are electrically connected only to the pixel units which are not electrically connected to any other data lines and located at boundary columns or at adjacent columns of the boundary columns of the pixel matrix. In the present embodiment as shown in FIG. 2, the first data line is electrically connected in sequence to a first pixel unit in a first row of the pixel matrix, a first pixel unit in a third row, . . . , a first pixel unit in the $m^{th}$ row (when m is an odd number).

Figure 3:
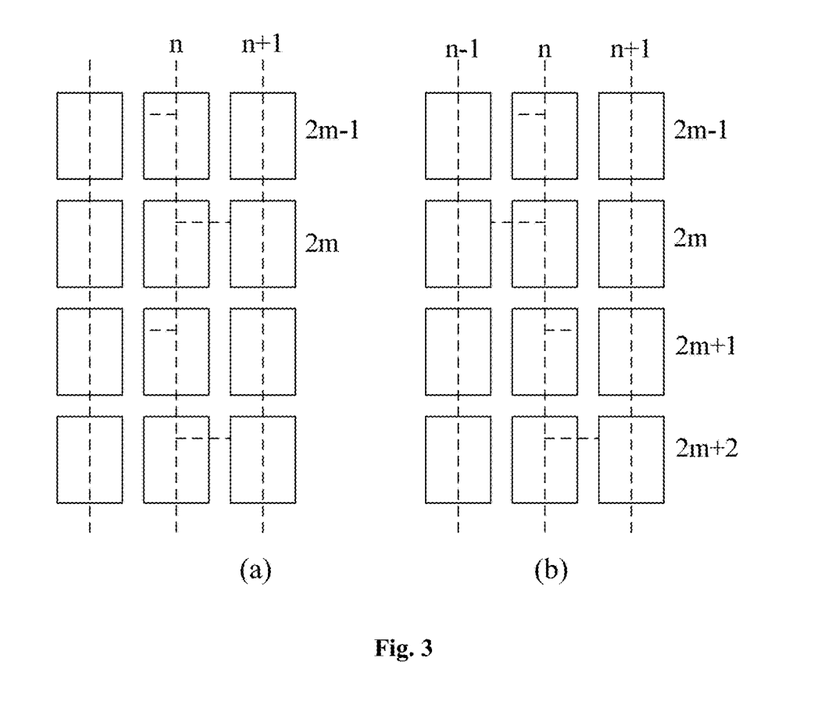

In other embodiments of the present disclosure, the data lines can be connected to the pixel units in other forms as shown in FIGS. 3 (a) and (b). In FIG. 3 (a), an $n^{th}$ data line is electrically connected in sequence to an $n^{th}$ pixel unit in a $(2m-1)^{th}$ row and an $(n+1)^{th}$ pixel unit in a $2m^{th}$ row of the pixel matrix, wherein m and n are both positive integers. In FIG. 3 (b), an $n^{th}$ data line is electrically connected in sequence to an $n^{th}$ pixel unit in a $(2m-1)^{th}$ row, an $(n-1)^{th}$ pixel unit in a $2m^{th}$ row, an $n^{th}$ pixel unit in a $(2m+1)^{th}$ row and an $(n+1)^{th}$ pixel unit of a $(2m+2)^{th}$ row of the pixel matrix, wherein m is a positive integer and n is a positive integer greater than 1.

When the array substrate of the above-described form is used to manufacture a liquid crystal display panel, it is possible to improve the aperture ratio of the pixel unit without any black matrix provided on the CF substrate, thereby improving the brightness of the liquid crystal display panel and ameliorating liquid crystal display effects. A method for driving the liquid crystal display panel as described above will be provided below. This method can eliminate vertical crosstalk and further improves the quality of images.

The method for driving the liquid crystal display panel comprises the steps of: driving, in display of a same picture frame, any two adjacent columns of pixel units with driving signals of different polarities respectively; and driving, in display of any two consecutive picture frames, a same column of pixel units with driving signals of different polarities respectively. Specifically, when one picture frame is displayed, all odd-numbered rows of the plurality of data lines are driven with positive-polarity (or negative-polarity) driving signals, and all even-numbered rows of the plurality of data lines are driven with negative-polarity (or positive-polarity) driving signals. When a next picture frame following the above picture frame is displayed, all odd-numbered rows of the plurality of data lines are driven with negative-polarity (or positive-polarity) driving signals, and all even-numbered rows of the plurality of data lines are driven with positive-polarity (or negative-polarity) driving signals. Therein, the positive-polarity driving signals are voltage signals applied to the pixel electrode and higher than a voltage applied to a common electrode voltage, and the negative-polarity driving signals are voltage signals applied to the pixel electrode and lower than the voltage applied to the common electrode voltage.

Figure 4:
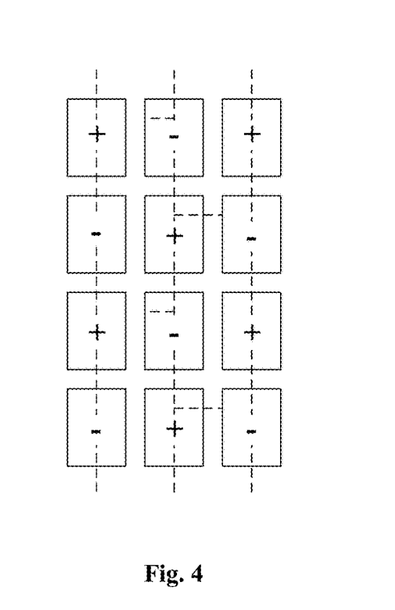
FIG. 4 schematically shows polarity distribution of voltages on pixel electrodes.

FIG. 4 schematically shows polarity distribution of voltages applied to the pixel electrodes during display of a picture frame when the liquid crystal display panel is driven by the driving method described above, wherein the data lines are connected to the pixel electrodes in a manner as shown in FIG. 2 or FIG. 3 (a). As FIG. 4 further shows, the above-described driving method enables the polarities of any two pixel electrodes located in adjacent rows and adjacent columns to be opposite to each other in each picture frame. And the coupling effect of the parasitic capacitance between the data lines and the pixel electrodes can be canceled out each other when the polarities of two adjacent pixel electrodes in the column direction are opposite to each other, thereby reducing vertical crosstalk. The display effect that can be achieved by the above-described driving method will be described in the following with reference to FIGS. 5 and 6.

Figure 5:
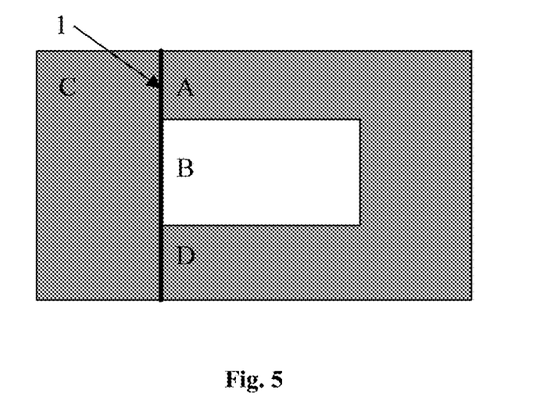
FIG. 5 schematically shows a principle for generation of vertical crosstalk.

FIG. 5 schematically shows a principle for generation of vertical crosstalk, which refers to a phenomenon that in display of some special pictures by the liquid crystal display device, a picture at a region will affect a picture at another region. As shown in FIG. 5, a white region B (grayscale 255)

is indicated in a middle of gray background (grayscale 128). Then, in straight line 1, the gray background can be divided into three regions A, C, and D in display effects, wherein a high potential on the pixel electrodes of an intermediate white region B pulls high, by the capacitive coupling effect of the parasitic capacitance between the data lines and the pixel electrodes, voltages on parts of the pixel electrodes in the region A and the region D. This renders brightness of the region A and the region D different from that of the region C, and vertical crosstalk thus occurs.

Figure 6A:
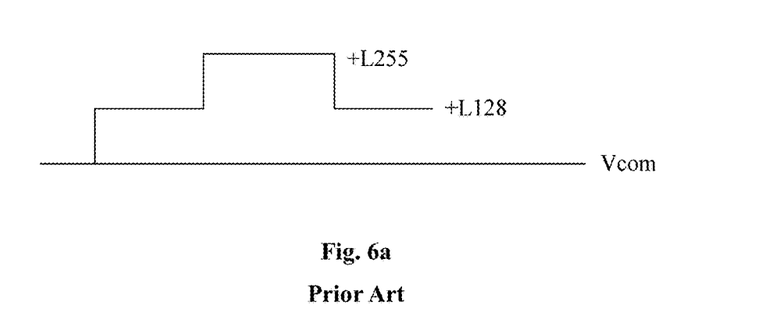

When an existing driving mode as shown in FIG. 6 (a) is used to display the above picture, grayscale voltages of the plurality of pixel units in the straight line 1 are different depending on gray levels displayed thereby. Therein, the voltages applied to the pixel electrodes can be divided into three levels. A voltage of grayscale 128 applied to the region A and the region D located at two ends is lower, and a voltage of grayscale 255 applied to the region B located at a middle section is higher. Voltage Vcom applied to the common electrode is constant. When the voltage on one pixel electrode (or some pixel electrodes) changes, since a plurality of parasitic capacitances between the data lines and the plurality of pixel electrodes satisfy a charge conservation principle, other pixel units around the pixel unit including said one pixel electrode will share such a change. That is, other pixel units around said one pixel unit cannot display a set grayscale.

Figure 6B:
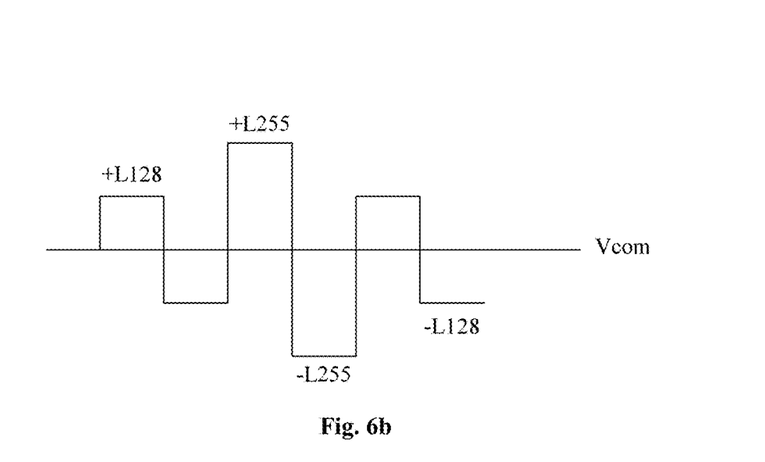

When the above-described picture is displayed by the driving method in the embodiment of the present disclosure, the polarities of any two pixel electrodes located in adjacent rows and adjacent columns are opposite to each other in each picture frame. Therefore, the grayscale voltages of the plurality of pixel units in the straight line 1 appear alternately with positive and negative polarities. As shown in FIG. 6 (b), the voltages on the pixel electrodes are alternately positive and negative, and differences between the voltages on the pixel electrodes and the voltage of the common electrode have an equal absolute value. The voltage Vcom applied to the common electrode is constant. When the voltage on one or some of the pixel electrodes changes, a voltage change triggered on the data line will be opposite. Such changes in voltages can thus cancel each other, thereby reducing influences of the pixel unit including the pixel electrode on surrounding pixel units. As a result, it is possible to reduce a capacitive coupling effect between the data line and the pixel electrode, thereby reducing vertical crosstalk and improving the quality of images.

The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

The invention claimed is:

1. An array substrate, comprising:
    a plurality of pixel units, which is arranged in a pixel matrix having rows and columns; and
    a plurality of data lines, which is arranged to run through the pixel units, each of the data lines capable of simultaneously driving a plurality of pixel units along a column direction,
    wherein with respect to each of the data lines inside of boundary data lines of the pixel matrix, two pixel units electrically connected thereto in sequence are located in adjacent rows and at adjacent columns in the pixel matrix, and
    wherein an $n^{th}$ data line among the plurality of data lines located inside of the boundary data lines of the pixel matrix is electrically connected in sequence to an $n^{th}$ pixel unit in a $(2m-1)^{th}$ row, an $(n-1)^{th}$ pixel unit in a $2m^{th}$ row, an $n^{th}$ pixel unit in a $(2m+1)^{th}$ row, and an $(n+1)^{th}$ pixel unit in a $(2m+2)^{th}$ row of the pixel matrix, m being a positive integer, and n being a positive integer greater than 1.

2. The array substrate according to claim 1, wherein gaps formed between the plurality of pixel units are shielded with a common electrode layer provided on the array substrate to prevent light leakage.

3. The array substrate according to claim 1, wherein the data lines are arranged to run through center portions of the pixel units.

4. The array substrate according to claim 1, wherein the boundary data lines of the pixel matrix include a leftmost data line and a rightmost data line in the pixel matrix.

5. The array substrate according to claim 4, wherein the boundary data lines of the pixel matrix are electrically connected only to pixel units which are not electrically connected to any other data lines and located either at boundary columns or at adjacent columns of the boundary columns of the pixel matrix.

6. A liquid crystal display panel, comprising an array substrate, which includes:
    a plurality of pixel units, which is arranged in a pixel matrix having rows and columns; and
    a plurality of data lines, which is arranged to run through the pixel units, each of the data lines capable of simultaneously driving a plurality of pixel units along a column direction,
    wherein with respect to each of the data lines inside of boundary data lines of the pixel matrix, two pixel units electrically connected thereto in sequence are located in adjacent rows and at adjacent columns in the pixel matrix, and
    wherein an $n^{th}$ data line among the plurality of data lines located inside of the boundary data lines of the pixel matrix is electrically connected in sequence to an $n^{th}$ pixel unit in a $(2m-1)^{th}$ row, an $(n-1)^{th}$ pixel unit in a $2m^{th}$ row, an $n^{th}$ pixel unit in a $(2m+1)^{th}$ row, and an $(n+1)^{th}$ pixel unit in a $(2m+2)^{th}$ row of the pixel matrix, m being a positive integer, and n being a positive integer greater than 1.

7. A method for driving a liquid crystal display panel, wherein the liquid crystal display panel comprises an array substrate, which includes:
    a plurality of pixel units, which is arranged in a pixel matrix having rows and columns; and
    a plurality of data lines, which is arranged to run through the pixel units, each of the data lines capable of simultaneously driving a plurality of pixel units along a column direction,
    wherein with respect to each of the data lines inside of boundary data lines of the pixel matrix, two pixel units electrically connected thereto in sequence are located in adjacent rows and at adjacent columns in the pixel matrix, and
    wherein the method comprises the steps of:
    driving, in display of a same picture frame, any two adjacent columns of pixel units with driving signals of different polarities respectively; and
    driving, in display of any two consecutive picture frames, a same column of pixel units with driving signals of different polarities respectively, and wherein an $n^{th}$ data line among the plurality of data lines located inside of the boundary data lines of the pixel matrix is electrically connected in sequence to an $n^{th}$ pixel unit in a $(2m-1)^{th}$ row, an $(n-1)^{th}$ pixel unit in a $2m^{th}$ row, an $n^{th}$ pixel unit in a $(2m+1)^{th}$ row, and an $(n+1)^{th}$ pixel unit in a $(2m+2)^{th}$ row of the pixel matrix, m being a positive integer, and n being a positive integer greater than 1.

8. The driving method according to claim 7, comprising:

driving, during display of a picture frame, odd-numbered columns of the plurality of data lines with positive-polarity driving signals, and even-numbered columns of the plurality of data lines with negative-polarity driving signals; and driving, during display of a next picture frame of the above picture frame, odd-numbered columns of the plurality of data lines with negative-polarity driving signals, and even-numbered columns of the plurality of data lines with positive-polarity driving signals.

9. The driving method according to claim 8, wherein the positive-polarity driving signals are voltage signals applied to the pixel electrode and higher than a voltage applied to a common electrode voltage, and the negative-polarity driving signals are voltage signals applied to the pixel electrode and lower than the voltage applied to the common electrode voltage.

* * * * *